US008641903B2

(12) United States Patent
Voccia et al.

(10) Patent No.: US 8,641,903 B2
(45) Date of Patent: Feb. 4, 2014

(54) METHOD FOR THE PREPARATION OF REACTIVE [18] F FLUORIDE (75) Inventors: Samuel Voccia, Liège (BE); Joël Aerts, Durbuy (BE); Christian Lemaire, Alleur (BE); André Luxen, Ocquier (BE); Jean-Luc Morelle, Liège (BE); Gauthier Philippart, Grand-Rechain (BE)

(73) Assignees: Trasis S.A., Liège (BE); Universite de Liège, Liège (BE)

( * ) Notice: Subject to any disclaimer, the term of this patent is extended or adjusted under 35 U.S.C. 154(b) by 923 days.

(21) Appl. No.: 12/596,254

(22) PCT Filed: Apr. 22, 2008

(86) PCT No.: PCT/BE2008/000030
§ 371 (c)(1),
(2), (4) Date: May 25, 2010

(87) PCT Pub. No.: WO2008/128306
PCT Pub. Date: Oct. 30, 2008

(65) Prior Publication Data
US 2010/0243972 A1 Sep. 30, 2010

(30) Foreign Application Priority Data

Apr. 23, 2007 (EP) .................................. 07008220

(51) Int. Cl.
*B01D 11/00* (2006.01)
*B01D 15/08* (2006.01)
*B01D 15/36* (2006.01)
*B01D 15/42* (2006.01)
*A61K 51/00* (2006.01)
*C01B 7/20* (2006.01)
*C01B 9/08* (2006.01)
*C09K 11/04* (2006.01)

(52) U.S. Cl.
USPC ........... 210/635; 210/638; 210/656; 210/663; 210/669; 210/673; 210/682; 210/683; 252/625; 423/249; 423/501; 424/1.85; 424/1.89

(58) Field of Classification Search
USPC ......... 210/635, 638, 656, 682, 683, 684, 663, 210/669, 670, 673, 688; 424/1.11, 1.81, 424/1.85, 1.89; 376/168, 190, 195; 423/2, 423/249, 501; 252/625
See application file for complete search history.

(56) References Cited

U.S. PATENT DOCUMENTS 3,459,634 A * 8/1969 Ruiz et al. ..................... 376/170
4,606,908 A * 8/1986 Bassingthwaighte et al. ........................... 424/1.85

(Continued)

FOREIGN PATENT DOCUMENTS

EP 0 798 307 A1 10/1997

OTHER PUBLICATIONS

Hamacher et al, Publication entitled Computer-aided Synthesis (CAS) of No-carrier-added 2-[18F] Fluoro-2-deoxy-d-glucose: an Efficient Automated System for the Aminopolyether-supported Nucleophilic Fluorination, 2211a Int. Journal of Radiation Applications and Instrumentation: Part A. 41 (published 1990), vol. No. 1, Marsh Barton, Exeter, GB.*

(Continued)

*Primary Examiner* — Joseph Drodge
(74) *Attorney, Agent, or Firm* — Merchant & Gould P.C.

(57) ABSTRACT

The present invention is related to a method to obtain reactive [18F] fluorides in an organic medium suitable for radiolabelling without any azeotropic evaporation step, by the use of a solid phase extraction column containing a modified nonionic solid support.

26 Claims, 2 Drawing Sheets (56) References Cited

U.S. PATENT DOCUMENTS

| | | | | |
|---|---|---|---|---|
| 5,425,063 | A * | 6/1995 | Ferrieri et al. | 376/195 |
| 6,749,830 | B2 * | 6/2004 | Wilson et al. | 424/1.11 |
| 7,112,318 | B2 * | 9/2006 | Madar et al. | 424/1.89 |
| 7,744,851 | B2 * | 6/2010 | DiMagno et al. | 424/1.11 |
| 8,206,571 | B2 * | 6/2012 | Clarke | 205/350 |
| 8,206,593 | B2 * | 6/2012 | Lee et al. | 210/640 |
| 8,366,934 | B2 * | 2/2013 | Aerts et al. | 210/635 |
| 8,491,790 | B2 * | 7/2013 | Lemaire et al. | 210/635 |
| 2007/0036258 | A1 * | 2/2007 | Ito et al. | 376/168 |
| 2007/0071671 | A1 * | 3/2007 | Hirano | 424/1.11 |
| 2008/0019906 | A1 * | 1/2008 | DiMagno et al. | 424/1.89 |
| 2008/0035542 | A1 * | 2/2008 | Mourtada et al. | 210/143 |
| 2008/0281090 | A1 * | 11/2008 | Lee et al. | 536/122 |
| 2008/0305042 | A1 * | 12/2008 | Gacek et al. | 424/1.89 |
| 2009/0242421 | A1 * | 10/2009 | Clarke | 205/350 |
| 2009/0277804 | A1 * | 11/2009 | Clarke | 205/742 |
| 2009/0311157 | A1 * | 12/2009 | Steel et al. | 423/249 |
| 2010/0196254 | A1 * | 8/2010 | Lemaire et al. | 423/501 |
| 2010/0243972 | A1 * | 9/2010 | Voccia et al. | 252/625 |
| 2011/0006011 | A1 * | 1/2011 | Aerts et al. | 210/682 |
| 2011/0305618 | A1 * | 12/2011 | Graham et al. | 423/249 |

OTHER PUBLICATIONS

Toorongian et al., "Routine production of 2-Deoxy-2-[18F]fluoro-D-glucose by direct nucleophilic exchange on a quaternary 4-Aminopyridinium Resin," *Nucl. Med. Biol.* (1990) 17 (3): 273-279.

Fortt et al., Proceeding of the 17$^{th}$ International Symposium on Radiopharmaceutical Sciences, Aachen (Germany), 2007.

* cited by examiner

METHOD FOR THE PREPARATION OF REACTIVE [18] F FLUORIDE

This application is a National Stage Application of PCT/BE2008/000030, filed Apr. 22, 2008, which claims benefit of Serial No. 07008220.1, filed Apr. 23, 2007 in the EPO and which application(s) are incorporated herein by reference. To the extent appropriate, a claim of priority is made to each of the above disclosed applications.

TECHNICAL FIELD

The present invention relates to a method for the extraction, concentration and reformulation of the [18F] fluoride contained in water.

BACKGROUND ART

Positron emission tomography (PET) is an imaging method to obtain quantitative molecular and biochemical information of physiological processes in the human body. The most common PET radiotracer in use today is [18F]-fluorodeoxyglucose ([18F]-FDG), a radiolabelled glucose molecule. PET Imaging with [18F]-FDG allows to visualize glucose metabolism and has a broad range of clinical indications. Among positron emitters, [18F] is the most widely used today in the clinical environment.

[18F] fluoride is produced by irradiation of water (containing $H_2^{18}O$) with protons resulting in the reaction $^{18}O(p,n)^{18}F$. Only a minor fraction of the [18O] is converted. For production efficiency and radiochemical purity, it is desirable to use water that is as highly enriched as possible. The physics of the production of [18F] fluoride by proton bombardment of water (amount of heat, proton energy range) typically requires, at least 1 mL of water. The volumes coming out of most cyclotron targets are in practice several mL.

The [18F] isotope is then separated from water and processed for production of a radiopharmaceutical agent. Conventional fluoride recovery is based on ion exchange resins. The recovery is carried out in two steps (extraction and elution): first the anions (not only fluoride) are separated from the enriched [18O] water and trapped on a resin and then, said anions, including [18F] fluoride, are eluted into a mixture containing water, organic solvents, a base, also called activating agent or phase transfer agent or phase transfer catalyst, such as for example the complex potassium carbonate-Kryptofix 222 ($K_2CO_3$-K222) or a tetrabutylammonium salt. The [18F] fluoride radiochemical recovery yield is very effective, usually exceeding 99%. The most usual labelling method, known as nucleophilic substitution, requires anhydrous or very low water content solutions and whatever the method used, an evaporation step always follows the recovery of the [18F]fluoride. It usually consists in multiple azeotropic evaporations of acetonitrile or low boiling temperature organic solvent, that require several minutes.

AIMS OF THE INVENTION

The aim of the invention is to simplify and speed up the preparation of a [18F] fluoride solution suitable for the labelling reaction, i.e. the substitution reaction, by the use of a modified non-ionic solid support, which allows to avoid the azeotropic evaporations prior to labelling.

BRIEF DESCRIPTION OF THE DRAWINGS

If R1, R2, R3 and R4 are alkyl chains, some of these chains may also be branched on one or several carbon atom(s) of said alkyl chains. Further, the alkyl chain may be substituted by halogen atoms on one or several carbon atom(s) of said alkyl chain (for example perfluorinated alkyl chain).

DISCLOSURE OF THE INVENTION

The method of the invention allows the preparation of a reactive fluoride solution for substitution reactions on both aliphatic and aromatic precursors, without any azeotropic evaporation step. Moreover, the resulting fluoride ions are made highly reactive even at room temperature. It brings two advantages: the reduction of the preparation duration, which results in an increase of the overall yield, and a simplification of the automated equipment needed for the synthesis of a radiotracer. In particular, the suppression of any azeotropic evaporation step facilitates the implementation of the synthesis microfluidic devices such as "lab-one-chip" in which these evaporations are difficult to perform.

Figure 1:
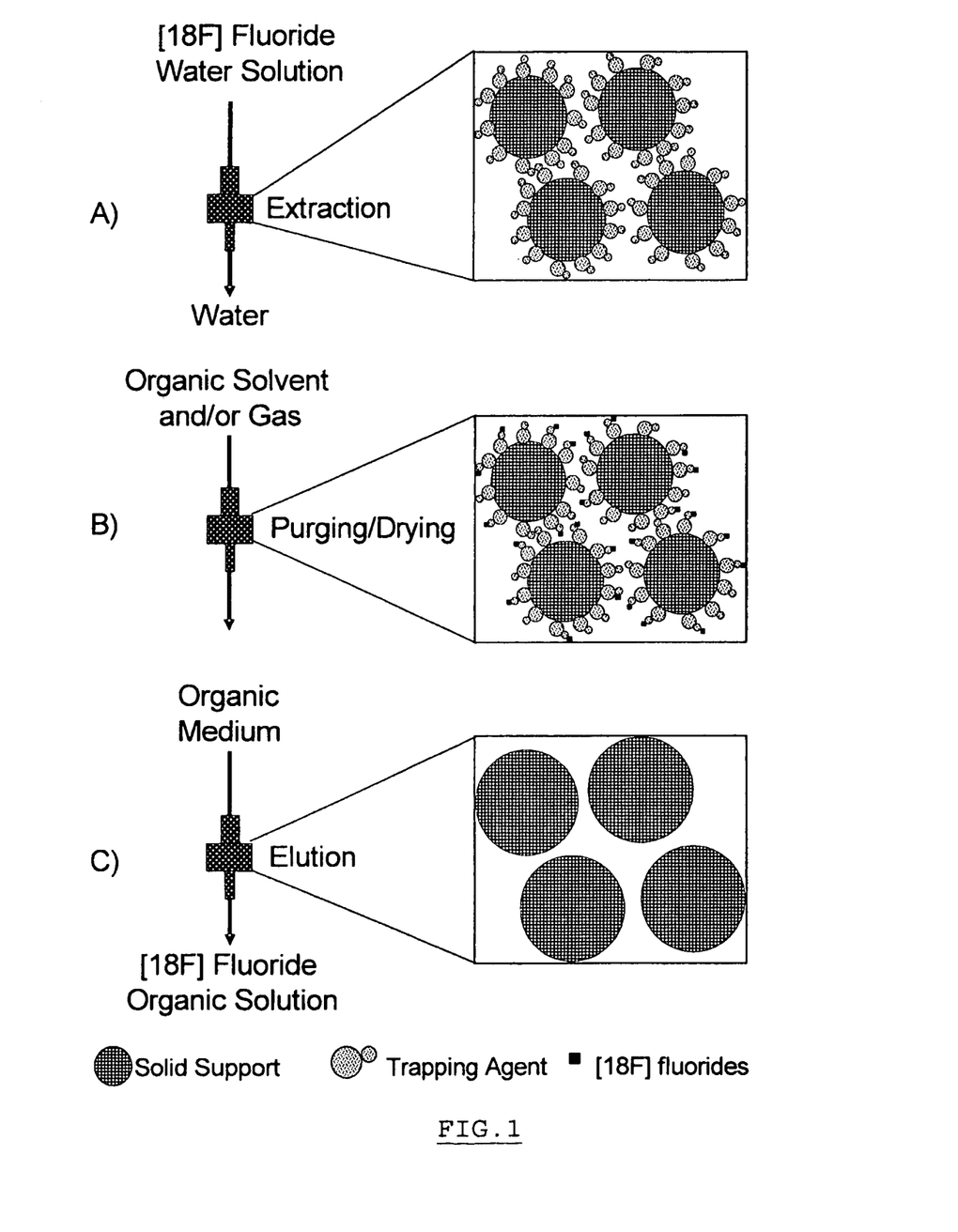
FIG. 1 schematically represents the extraction/elution process for the [18F] fluoride recovery method which is the object of the invention. A) Modified solid support (SS) prior to the extraction process, B) [18F] fluoride trapped on the SS as a TA-[18F] species, C) Bare SS after elution, TA, among which TA-[18F] species, being released by the elution solution.

According to the present invention, the extraction process is performed by passing the [18F] aqueous solution on a non-ionic solid support (SS). As shown on FIG. 1A), this solid support has the characteristic to be loaded with a trapping agent (TA), which is adsorbed on the solid support and allows the [18F] activity to be trapped because of its positive charge. This trapping agent is selected in such a way that it does not impact unfavorably on the yield of the subsequent labelling reaction. It is preferably a base suitable for the labelling reaction. The solid support is then flushed with a gas or a neutral solvent to remove or push out most of the residual water (FIG. 1B). Indeed, the remaining water amount is sufficiently low to not be detrimental for the subsequent labelling step. The activity is at last eluted in an organic solvent or in a mixture of organic solvents and is immediately usable for the labelling of aromatic or aliphatic radiotracer precursors (FIG. 1C)) even at low temperature.

The present invention is distinguished from prior art by the fact that the nature of the phase allows the direct elution of the [18F] activity in a medium suitable for radiolabelling. However, a small amount of water does neither impact on the recovery yield nor on the radiochemical yield of the reaction (R. FORTT et al., Proceeding of the 17$^{th}$ International Symposium on Radiopharmaceutical Sciences, Aachen (Germany), 2007). In the method of prior art, the fluoride is eluted by an ion exchange method, which is only possible in the presence of a certain amount of water or in a solvent polar enough to solubilise ions, which is generally not suitable for the subsequent labelling step. In the present invention, under the effect of an organic solvent, the fluoride is eluted by displacement/desorption of the trapping agent adsorbed on the non-ionic support. The eluting medium may be an organic solution containing either the said base or the chosen precursor, or a mixture of them. The [18F] activity is directly in solution and not in a "dry form" on the surface of a reactor, as it would result from the evaporation step of prior art. The recovered solution is reactive and immediately usable for the labelling reactions.

In the method of prior art, after radiolabelling, the labelled precursor, which is generally a low polarity compound, is extracted on a similar solid support as used in the present invention for the [18F] fluoride recovery step and is subsequently deprotected generally by acid or basic hydrolysis. Thus, another specific advantage of the method of the present invention is that the properties of the solid support are restored after the elution process. Moreover, the same solid support can be used for both the fluoride ions extraction/elution process and for the purification, reformulation and deprotection of the labelled precursor resulting from the labelling reaction.

According to the present invention, the extraction step of the method is performed by passing the [18F] aqueous fluoride solution through a solid phase extraction column containing a modified solid support. The [18F] fluoride is trapped on the modified solid support.

In some embodiments of the present invention, the solid support (SS) is selected from the group of solid phase extraction resins or liquid chromatography resins consisting of polar and non-polar phases functionalized with or made of alkyl chains comprising 1 to 30 carbon atoms, for example C2, tC2 C4, C8, C18, tC18, C30, polystyrene, cyclohexyl, poly(divinylbenzene), poly(styrene-divinylbenzene), phenyl, polyamide, amino propyl (NH2), cyanopropyl (CN), alcohols or diols, carboxymethyl, hydroxylated poly(styrene-divinylbenzene), diethylaminoethyl, quaternary aminoethyl, sulfopropyl, etc.

In some preferred embodiments of the invention, the SS is selected from the group consisting of solid phase extraction resins and liquid chromatography resins having intermediate polar/non-polar and/or hydrophilic/lipophilic properties. These properties generally result from the copolymerization of divinylbenzene and/or styrene, or the surface functionalization of preformed beads made of (co)polymers of divinylbenzene and styrene by the copolymerization with a co-monomer (vinyl compound). Suitable vinyl compounds used for copolymerization or surface functionalization include vinylpyrrolidone, vinylacetate, (methacryloyloxymethyl)naphtalene, 4,4'-bis(maleimido)diphenylmethane, p,p'-dihydroxydiphenylmethane diglycidylmethacrylic ester, p,p'-dihydroxydiphenylpropane diglycidylmethacrylic ester, 2-hydroxyethylmethacrylate (HEMA), 2,2-dimethylaminoethylmethacrylate (DMAEMA), ethylenedimethacrylate glycidylmethacrylate, N-vinylcarbazole, acrylonitrile, vinylpyridine, N-methyl-N-vinylacetamide, aminostyrene, methylacrylate, ethylacrylate, methylmethacrylate, N-vinylcaprolactam, N-methyl-N-vinylacetamide. Brand names for these solid supports are Oasis® HLB from Waters, $H_2O$-Philic DVB from Mallinckrodt™ J.T. Baker®, Waters Porapak™ RDX, StrataX and Synergi Polar-RP from Phenomex, etc.

In some embodiments of the present invention, the SS is selected from the group of solid phase extraction resins and liquid chromatography resins having intermediate polar/non-polar and/or hydrophilic/lipophilic properties such as graphitized carbon phase. Brand names for these solid supports are Hypercarb™ from Thermo Electron Corp. and Carbograph from Alltech.

Preferred Embodiment for the Choice of the Couple Solid Support-trapping Agent (SS-TA)

Prior to the [18F] fluoride extraction step a specific preparation of the SS is performed: a trapping agent (TA) is adsorbed on the SS. The TA adsorbed on the SS is selected for its ability to trap the [18F] fluoride by an anion exchange process, forming a TA-[18F] species. The couple SS-TA is chosen for its specific interaction which allows the TA to be well-retained on the SS in aqueous media, thus during the extraction process, while being easily released and solubilized in polar aprotic solvents suitable for radiolabelling. This is preferably achieved with phases having these intermediate polar/non-polar and/or hydrophilic/lipophilic properties, which ensures quantitative extraction/elution process when the TA is well selected (see Table 1).

On the polar SS, the TA must be sufficiently polar to remain on the SS during the extraction, which makes the resulting SS-TA couple apparently polar and has the tendency to retain too much the water. On the other hand, for the non-polar SS, the TA must be sufficiently polar to be eluted from the SS during the elution process with a non-polar protic solvent, which makes again the resulting SS-TA couple globally polar and has again the tendency to retain too much the water. Conversely, SS with intermediate polarity are preferably used, because these allow the use of less polar TA than polar SS and non-polar SS. Thus, following the extraction process, efficient water elimination by a flush with a gas or a neutral solvent is made possible. Indeed, contrary to what happens on polar SS-TA or non-polar SS-TA couples, the apparent lowered polarity of the hydrophilic/lipophilic SS-TA couple ease water elimination.

Moreover, the TA is selected in such a way that it does not impact unfavourably on the yield of the subsequent labelling reaction. It is thus preferably a base positively charged, also called activating agent or phase transfer agent or phase transfer catalyst, suitable for the labelling reaction and that can be selected in the group of metal salt complexes. This complexing agent ensures the trapping of the metal salt on the SS and its ability to subsequently dissolve in the organic medium. The complexing agent itself can even behave as TA.

The metal salt cation is preferably selected from the alkali group consisting of lithium, sodium, potassium, rubidium, and cesium or from the alkaline earth metal group consisting of magnesium, calcium, strontium, and barium. The cation could also be an ammonium ($NH_4^+$).

The salt is preferably selected from the group consisting of halogenides (F, Cl, Br, I), hydroxide, carbonates, phosphates, sulfates, carboxylates, acetate, alcoholates and perchlorate.

The complexing agent, selected for its ability to remain on the SS in aqueous environment and to be released in an organic environment, suitable for the subsequent chemistry, is comprised in the group of cryptands, including kryptofixs such as 1,4,10-Trioxa-7,13-diaza-cyclopentadecane, 4,7,13, 16,21,24-Hexaoxa-1,10-diazabicyclo[8.8.8]hexacosane, 4,7, 13,16,21-Pentaoxa-1,10-diazabicyclo[8.8.5]tricosane, 4,7, 13,18-Tetraoxa-1,10-diazabicyclo[8.5.5]eicosane, 5,6-Benzo-4,7,13,16,21,24-hexaoxa-1,10-diazabicyclo[8.8.8] hexacos-5-ene; the group of glymes including crown ethers such as for example 4'-Aminobenzo-15-crown-5, 4'-Aminobenzo-15-crown-5, 4'-Aminobenzo-15-crown-5 hydrochloride, 4'-Aminobenzo-18-crown-6, 4'-Aminodibenzo-18-crown-6, 2-Aminomethyl-15-crown-5, 2-Aminomethyl-15-crown-5, 2-Aminomethyl-18-crown-6, 4'-Amino-5'-nitrobenzo-15-crown-5, 4'-Amino-5'-nitrobenzo-15-crown-5, 1-Aza-12-crown-4, 1-Aza-15-crown-5, 1-Aza-15-crown-5, 1-Aza-18-crown-6, 1-Aza-18-crown-6, Benzo-12-crown-4, 5,6-Benzo-4,7,13,16,21,24-hexaoxa-1,10-diazabicyclo

[8.8.8]hexacos-5-ene, 1-Benzyl-1-aza-12-crown-4, Bis[(benzo-15-crown-5)-15-ylmethyl]pimelate, 4'-Bromobenzo-15-crown-5, 4-tert-Butylbenzo-15-crown-5, 4-tert-Butylcyclohexano-15-crown-5, 4'-Carboxybenzo-15-crown-5, polyethylene glycols (PEG), polyethylene oxides (PEO); the group of calixarenes such as for example 4-tert-Butylcalix[4]arene, 4-tert-Butylcalix[4]arene, 4-tert-Butylcalix[4]arene, 4-tert-Butylcalix[5]arene, 4-tert-Butylcalix[6]arene, 4-tert-Butylcalix[6]arene, 4-tert-Butylcalix[6]arene, 4-tert-Butylcalix[8]arene, 4-tert-Butylcalix[8]arene, 4-tert-Butylcalix[4]arene-tetraacetic acid tetraethyl ester, 4-tert-Butylcalix[4]arenetetraacetic acid tetraethyl ester, 4-tert-Butylcalix[4]arene-tetraacetic acid triethyl ester, Calix[4]arene, Calix[6]arene, Calix[8]arene, 4-(Chloromethyl)calix[4]arene, 4-Isopropylcalix[4]arene, C-Methylcalix[4]resorcinarene, C-Methylcalix[4]resorcinarene, meso-Octamethylcalix(4)pyrrole, 4-Sulfocalix[4]arene, 4-Sulfocalix[4]arene sodium salt, C-Undecylcalix[4]resorcinarene monohydrate, C-Undecylcalix[4]resorcinarene monohydrate, the group of cyclodextrines such as α-Cyclodextrin, β-Cyclodextrin, γ-Cyclodextrin, (2,6-Di-O-)ethyl-β-cyclodextrin, 6-O-α-D-Glucosyl-β-cyclodextrin, Heptakis(6-O-t-butyldimethylsilyl-2,3-di-O-acetyl)-β-cyclodextrin, Heptakis(2,6-di-O-methyl)-β-cyclodextrin, Heptakis(2,3,6-tri-O-acetyl)-β-cyclodextrin, Heptakis(2,3,6-tri-O-benzoyl)-β-cyclodextrin, Hexakis (6-O-tertbutyl-dimethylsilyl)-α-cyclodextrin, Hexakis (2,3,6-tri-O-acetyl)-α-cyclodextrin, Hexakis (2,3,6-tri-O-methyl)-α-cyclodextrin, (2-Hydroxyethyl)-β-cyclodextrin, 6-O-α-Maltosyl-β-cyclodextrin hydrate, Methyl-β-cyclodextrin, 6-Monodeoxy-6-monoamino-β-cyclodextrin, Octakis (6-O-t-butyldimethylsilyl)-γ-cyclodextrin, Sulfopropyl-β-cyclodextrin, Triacetyl-α-cyclodextrin, Triacetyl-β-cyclodextrin; and the group of EDTA and derivatives such as for example Ethylenediamine-N,N'-diacetic acid, 2-Bis(2-aminophenoxy)ethane-N,N,N',N'-tetraacetic acid, trans-1,2-Diaminocyclohexane-N,N,N',N'-tetraacetic acid monohydrate, trans-1,2-Diaminocyclohexane-N,N,N',N'-tetraacetic acid monohydrate, 1,3-Diamino-2-hydroxypropane-N,N,N', N'-tetraacetic acid, 1,2-Diaminopropane-N,N,N',N'-tetraacetic acid, 1,3-Diaminopropane-N,N,N',N'-tetraacetic acid, 1,3-Diamino-2-propanol-N,N,N',N'-tetraacetic acid, Diethylenetriamine-pentaacetic acid calcium trisodium salt hydrate, N-(2-Hydroxyethyl)ethylenediaminetriacetic acid trisodium salt hydrate, N-(2-Hydroxyethyl)ethylenediamine-N,N',N'-triacetic acid.

In some preferred embodiments of the present invention, the complexing agent selected for its ability to remain on the SS in aqueous environment and to be released in an organic environment, suitable for the subsequent chemistry, is functionalized by a substituting group, which is for example an alkyl chain which may comprise from 1 to 30 carbon atoms and especially from 1 to 16 carbon atoms, aryl group such as benzyl, cycles, like for example cyclohexane, cyclooctane, or polycycles, like for example naphthalene, a polymer or any moiety having a chemical function with specific binding properties toward the solid support. This chains may also be branched on one or several carbon atom(s) of said alkyl chains. Further, the alkyl chain may be substituted by halogen atoms on one or several carbon atom(s) of said alkyl chain (for example perfluorinated alkyl chain). Said functional group ensures a good interaction of the complexing agent with the solid support, while leaving intact the accessibility of the complexing group.

Figure 2:
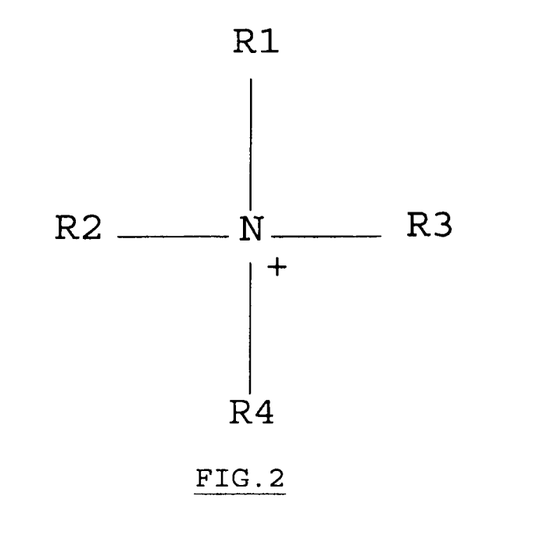
FIG. 2 and FIG. 3 schematically represent the ammonium salt and the phosphonium salt respectively, used as trapping agent or as an added base in the elution solution. R1, R2, R3 and R4, which may be identical or different substituting groups, are for example hydrogen atoms, alkyl chains which may comprise from 1 to 30 carbon atoms and especially from 1 to 16 carbon atoms, aryl chains such as benzyl, cycles, like for example cyclohexane, cyclooctane, or polycycles, like for example naphthalene, a polymer or any moiety having a chemical function with specific binding properties toward the solid support.

The TA can be selected from the group consisting of ammonium salts and more preferably the quaternary ammonium salts (X—N$^+$R1R2R3R4) as shown in FIG. 2.

Figure 3:
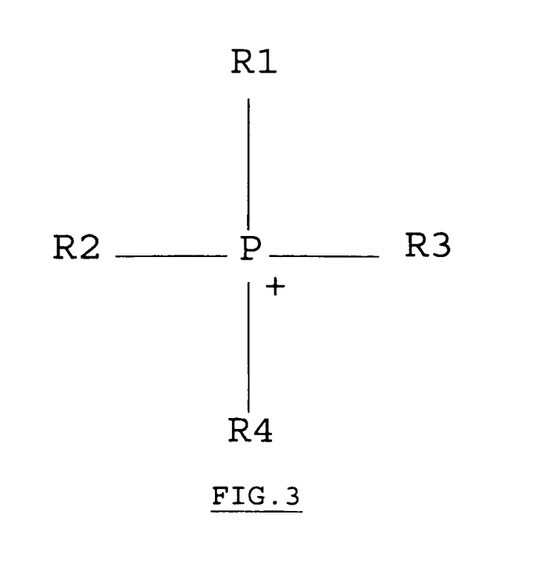

The TA can also be selected from the group consisting of phosphonium salts and more preferably the quaternary phosphonium salts (X—P$^+$R1R2R3R4) as shown in FIG. 3.

The TA is preferably an asymmetric quaternary ammonium salt as shown on FIG. 2 or an asymmetric quaternary phosphonium salt as shown on FIG. 3, with R1=R2=R3, R4 being a longer alkyl chain than R1, R2 and R3. This longer chain is responsible for the hydrophobic interaction of the TA with the SS. Moreover, this structure favours the accessibility of the positive charge which is taken into account for a good [18F] fluoride extraction. More preferably, R1, R2 and R3 are alkyl chains with 1 to 4 carbon atoms and R4 is an alkyl chain with 7 to 18 carbon atoms. The alkyl chain R1-R4 may also be substituted by halogen atoms on one or several carbon atom(s) of said alkyl chain (for example perfluorinated alkyl chain).

The TA can be selected from the group consisting of sulfonium salts (X—S$^+$R1R2R3).

The TA can be selected from the group consisting of ionic liquids including 1-Ethyl-3-methylimidazolium bromide, 1-Ethyl-3-methylimidazolium hexafluorophosphate, 1-Ethyl-3-methylimidazolium hexafluoroantimonate, 1-Ethyl-3-methylimidazolium tetrafluoroborate, 1-Ethyl-3-methylimidazolium trifluoromethanesulfonate, 1-Ethyl-3-methylimidazolium methanesulfate, 1-Ethyl-3-methylimidazolium tosylate, 1-Ethyl-3-methylimidazolium bis[salicylato(2-)]-borate, 1-Ethyl-3-methylimidazolium cobalt tetracarbonyl, 1-Butyl-3-methylimidazolium chloride (FutureChem Co LTD).

The preparation of the modified SS is performed by adsorbing a metal salt complex or an ammonium/phosphonium salt or an ionic liquid onto the SS. In the specific case of the metal salt complexes, the preparation can be performed in two steps: the first one consists in adsorbing the complexing agent, the second one being the complexation of the metal salt by the complexing agent previously trapped on the SS. The type of anion present on the support can be converted by an anion exchange process on TA-modified SS.

In some embodiments of the present invention, after the extraction process, the column is rinsed with a non-eluting organic solvent that allows the elimination of the residual water that may be undesirable for a subsequent chemical processing, whilst keeping the extracted anions trapped on the TA.

In some embodiments of the present invention, protic solvents such as alcohols can be passed through the column to eliminate most of the remaining water, whilst keeping the extracted anions trapped on the TA.

In some embodiments of the present invention, the protic solvent is preferably selected from the group consisting of primary alcohols such as methanol, ethanol, n-propanol, n-butanol, amyl alcohol, n-hexyl alcohol, n-heptanol, or n-octanol; secondary alcohols such as isopropanol, isobutanol, isoamyl alcohol, 3-pentanol; and tertiary alcohols such as t-butanol, t-amyl alcohol, 2,3-dimethyl-2-butanol, 2-(trifluoromethyl)-2-propanol, 3-methyl-3-pentanol, 3-ethyl-3-pentanol, 2-methyl-2-pentanol, 2,3-dimethyl-3-pentanol, 2,4-dimethyl-2-pentanol, 2-methyl-2-hexanol, 2-cyclopropyl-2-propanol, 2-cyclopropyl-2-butanol, 2-cyclopropyl-3-methyl-2-butanol, 1-methylcyclopentanol, 1-ethylcyclopentanol, 1-propylcyclopentanol, 1-methylcyclohexanol, 1-ethylcyclohexanol, and 1-methylcycloheptanol. More preferably the alcohol is selected from the group consisting of tertiary alcohols such as t-butanol, t-amyl alcohol, 2,3-dimethyl-2-butanol and 2-(trifluoromethyl)-2-propanol.

In some embodiments of the present invention, the protic solvent is preferably selected from the group consisting of tertiary diols or polyols, thus with alcohol functions as present on the compound from the group of tertiary alcohols exemplified above.

In some embodiments of the present invention, a non-polar organic solvent, such as an hydrocarbon or an alkane, is passed through the column to eliminate most of the remaining water, whilst keeping the extracted anions trapped on the TA.

In some preferred embodiments of the present invention, the non-polar organic solvent is selected in the list of pentane, hexane, heptane, octane, nonane, decane, cyclohexane.

In some preferred embodiments of the present invention, a flush of gas such as air, nitrogen or argon can be used to purge the column and eliminate most of the remaining water, which falls down lower than 20000 ppm, preferably lower than 7500 ppm, the drying method of the present invention allowing the elimination of water down to 1000 ppm of residual water in the solution eluted from the column.

In some embodiments of the invention, this drying step is assisted by heating-up the SS.

In some embodiments of the present invention, the dried solid support can be used as a mean to convey dry [18F] isotopes from a production center (cyclotron) to the location where it will be used for PET radiotracer preparation such as radiopharmacies or research laboratories.

In some embodiments of the present invention, the column containing the extracted [18F] fluoride in a reactive form can be used as a reactor to carry out a subsequent labelling reaction.

According to the present invention, in a further step, a low or no water content organic solvent is used to quantitatively elute the TA, among which the TA-[18F] species, from the SS. The organic solvent is chosen in such a way that the eluted medium is suitable for the aliphatic or aromatic labelling reaction without any further evaporation step, the residual water being lower than 20000 ppm, preferably lower than 7500 ppm, the drying method of the present invention allowing the elimination of water down to 1000 ppm of residual water in the solution eluted from the column.

In some embodiments of the present invention, this organic solvent can be selected among acetonitrile (ACN), dimethylsulfoxide (DMSO), dimethylformamide (DMF), tetrahydrofuran (THF), dioxane, ethyl acetate, sulfolane, hexamethylphosphotriamide (HMPA/HMPT), nitromethane, etc. and a mix of these solvents.

In some embodiments of the present invention, the solvent used for the elution process is selected from the group consisting of primary alcohols such as methanol, ethanol, n-propanol, n-butanol, amyl alcohol, n-hexyl alcohol, n-heptanol, or n-octanol; secondary alcohols such as isopropanol, isobutanol, isoamyl alcohol, 3-pentanol; and tertiary alcohols such as t-butanol, t-amyl alcohol, 2,3-dimethyl-2-butanol, 2-(trifluoromethyl)-2-propanol, 3-methyl-3-pentanol, 3-ethyl-3-pentanol, 2-methyl-2-pentanol, 2,3-dimethyl-3-pentanol, 2,4-dimethyl-2-pentanol, 2-methyl-2-hexanol, 2-cyclopropyl-2-propanol, 2-cyclopropyl-2-butanol, 2-cyclopropyl-3-methyl-2-butanol, 1-methylcyclopentanol, 1-ethylcyclopentanol, 1-propylcyclopentanol, 1-methylcyclohexanol, 1-ethylcyclohexanol, and 1-methylcycloheptanol. More preferably the alcohol is selected from the group consisting of tertiary alcohols such as t-butanol, t-amyl alcohol, 2,3-dimethyl-2-butanol and 2-(trifluoromethyl)-2-propanol.

In some embodiments of the present invention, the solvent used for the elution process is preferably selected from the group consisting of tertiary diols or polyols, thus with alcohol functions as present on the compound from the group of tertiary alcohols exemplified above.

In some embodiments of the present invention, the solvent used for the elution process is any mixture of the solvents cited above.

In some embodiments of the present invention, a base such as a metal salt, suitable for the labelling reaction, is contained in the organic solvent used to elute the TA from the SS, the solubility of the salt in the organic medium being ensured by a complexing agent comprised in the groups of cryptand, glymes, calixarenes, cyclodextrines and EDTA and its derivatives.

In some embodiments of the present invention, the base contained in the organic solvent used to elute the TA from the SS can be selected in the group of ammonium salts and more preferably the quaternary ammonium salts as shown in FIG. 2.

In some embodiments of the present invention, the base contained in the organic solvent used to elute the TA from the SS can be selected in the group of phosphonium salts and more preferably the quaternary phosphonium salts as shown in FIG. 3.

In some embodiments of the present invention, the base contained in the organic solvent used to elute the TA from the SS is preferably selected from the group consisting of organic bases such as 1,8-Diazabicyclo[5.4.0]undec-7-ene (DBU), 4-Dimethylaminopyridine (DMAP), 1,4-Diazabicyclo[2.2.2]octane (DABCO), 2,6-Lutidine, Pyridine (Py), alkylamines, dialkylamines, trialkylamines, Diisopropylethylamine (Hünig's Base).

In some embodiments of the present invention, the base contained in the organic solvent used to elute the TA from the SS is preferably selected from the group consisting of phosphazene bases such as 2-tert-Butylimino-2-diethylamino-1,3-dimethyl-perhydro-1,3,2-diazaphosphorine, tert-Butylimino-tris(dimethylamino)phosphorane, 1,1,1,3,3,3-Hexakis(dimethylamino)diphosphazenium fluoride, Iminotris(dimethylamino)phosphorane, Phosphazene base P1-t-Bu, Phosphazene base P2-t-Bu, Phosphazene base P4-t-Bu, Tetrakis[tris(dimethylamino)phosphoranylidenamino]Phosphonium fluoride.

In some embodiments of the present invention the organic solution used to elute the TA is heated up to enhance the elution of the adsorbed TA, among which the TA-[18F] species.

In some embodiments of the present invention, the precursor for the labelling reaction is contained in the organic medium used to elute the TA.

In some embodiments of the invention, the ions among which the [18F] fluoride, are rinsed out of the column by a saline aqueous or alcoholic solution. The solution obtained is then readily injectable after dilution, for specific molecular imaging indications.

The obtained organic solution containing the [18F] fluoride can be used for the synthesis of a PET radiotracer. The [18F] fluoride is reactive, even at room temperature, for substitution reactions on both aliphatic and aromatic precursors.

For some specific labelling reactions, a suitable base can be added prior to labelling in the eluted [18F] fluoride solution.

An additional advantage of the method of the present invention is that, for the purification, reformulation and deprotection of the labelled precursor resulting from the labelling reaction, the same SS as used for the [18F] fluoride extraction/elution process can be reused, which results in a simplification of implementation of this method on automated equipment used for the synthesis of a radiotracer.

In some embodiment of the present invention, the labelled precursor trapped on the column is eluted in a suitable solvent prior to a deprotection reaction.

In some embodiment of the present invention, said deprotection reaction, is directly performed within the column containing the SS or by including this column in a reaction circuit.

Preferred Embodiment for a [18F] Fluoride Preconcentration

Aiming at the implementation of the method of the current invention into a miniaturized synthesis system, it is desirable to limit the size of the modified SS as much as possible in order to elute the activity in the smallest possible amount of solution for subsequent labelling. Moreover, the amount of initial [18F] fluoride solution that a given modified SS can handle is limited by the migration of the TA on the SS.

On the other hand, the volume of initial aqueous [18F] fluoride solution delivered by cyclotron systems may vary up to 10 mL or even beyond, and may exceed the capacity of the modified SS.

Therefore, a preliminary concentration of the aqueous initial [18F] fluoride solution can be required to accommodate a wide volume range of initial aqueous [18F] fluoride solution.

Such a preconcentration can be advantageously performed on a column comprising an anion exchange phase, such as a quaternary ammonium resin like Waters QMA, preconditioned with $K_2CO_3$, and an acid phase such as a sulfonic (like Dowex) or carboxylic resin. The anion exchange phase allows to recover [18F]-enriched water and the acid phase allows to transforms carbonates ions, which could be detrimental for the subsequent said extraction process of the present invention, into carbon dioxide. The combination of these two solid phases allows to recover the activity in a volume many times lower (typically 3 to 40 times) and thus compatible with the volume of the small modified non-ionic solid support column according to the present invention.

EXAMPLES

Table 1 below shows the advantages of modified intermediate polar/non-polar and/or hydrophilic/lipophilic phases (second half of the table) on the recovery (extraction/elution) of [18F] fluorides from water in comparison with modified apolar phases (first half of the table).

TABLE 1

|  | SOLID SUPPORT | CONDITIONING | EXTRACTION % | ELUTION % | SOLVANT | TOTAL % |
|---|---|---|---|---|---|---|
| NON POLAR PHASES | Waters C18 | PEG35000/K2CO3 | 28.68 | 99.3 | DMSO | 28.5 |
|  | Waters C18 | PEG5000/K2CO3 | 28.68 | 94.8 | DMSO | 27.2 |
|  | Waters C18 | elutant QMA | 18.37 | 85.5 | ACN | 15.7 |
|  | Waters C18 | C8CI | 41.59 | 21.52 | ACN | 8.95 |
|  | Waters C18 | PEG/K2CO3 | 22.37 | 38.5 | — | 8.6 |
|  | Waters C18 | C10Br | 92.18 | 4.98 | ACN | 4.59 |
|  | Waters C18 | ILS | 55.50 | 6.15 | ACN | 3.42 |
|  | Waters C18 | TBACO3 | 84.58 | 1.5 | ACN | 1.2 |
|  | Waters C18 | C16Br | 100.00 | 0.0 | DIV | 0.0 |
|  | Waters C18 | K222/K2CO3 | 41.81 | — | — | — |
|  | Waters C18 | TEACO3 | 6.43 | — | — | — |
|  | Waters C18 | TEACO3 | 3.25 | — | — | — |
|  | Waters C18 | TBACO3 | 2.82 | — | — | — |
|  | Waters C18 | BZTBACI | 17.13 | — | — | — |
|  | Waters C18 | ILS | 4.71 | — | — | — |
|  | Waters C18 | PEG-C11 | 2.68 | — | — | — |
|  | Waters C18 | C6Br | 33.71 | — | — | — |
| INTERMEDIATE POLARITY PHASES | HYPERCARB | C10Br/K2CO3 | 100.0 | 100.0 | ACN | 100 |
|  | HYPERCARB | C10Br/K2CO3 | 100.0 | 100.0 | ACN | 100 |
|  | HYPERCARB | C10Br/K2CO3 | 100.0 | 100.0 | ACN | 100.0 |
|  | HYPERCARB | C10Br/K2CO3 | 100.0 | 100.0 | ACN/ButOH | 100.0 |
|  | HYPERCARB | C10Br/K2CO3 | 100.0 | 100.0 | ACN | 100.0 |
|  | HYPERCARB | C14Br | 100.0 | 93.97 | ACN/ButOH | 93.97 |
|  | HYPERCARB | K222/K2CO3 | 98.87 | 90.3 | ACN | 89.3 |
|  | OASIS HLB | K222/K2CO3 | 98.11 | 99.9 | ACN | 98.0 |
|  | OASIS HLB | K222/K2CO3 | 97.98 | 94.1 | ACN | 92.2 |
|  | OASIS HLB | K222/K2CO3 | 97.98 | 94.1 | ACN | 92.2 |
|  | OASIS HLB | K222/K2CO3 | 97.98 | 94.1 | ACN | 92.2 |
|  | OASIS HLB | K222/K2CO3 | 97.98 | 94.1 | ACN | 92.2 |
|  | OASIS HLB | C14Br/K2CO3 | 93.58 | 97.7 | ACN | 91.4 |
|  | OASIS HLB | C12Br/K2CO3 | 98.75 | 90.8 | DMSO | 89.7 |
|  | OASIS HLB | C10Br/K2CO3 | 84.28 | 99.0 | ACN | 83.4 |
|  | Poly 18-6 | K2CO3 | 24.97 | — | — | — |
|  | Poly 18-6 | C18-6 | 0.00 | — | — | — |

Examples of [18F] Fluoride Extraction

Conditioning of the phases: a solution of the trapping agent or the complexing agent in water or water/organic solvent mixture is used to condition the solid support. Optionally, the trapping agent or the complexing agent adsorbed on the support can then be modified by passing an aqueous salt solution through the column. The column is then rinsed with pure water.

Example 1

A 200 μL solution containing 701 μCi of [18F], obtained by rinsing a cyclotron target with water and diluting it, is passed through a C8/tetraethylammonium carbonate pre-conditioned column in 12 seconds using a syringe pump. The activity extracted from the solution and actually trapped on the column is measured. This allows extracting 92% (648 μCi) of the activity passed through the column.

Example 2

A 250 μL solution containing 843 μCi of [18F] is passed through a C18/tetrabutylammonium carbonate pre-conditioned column in 15 seconds using a syringe pump. The activity extracted from the solution and actually trapped on the column is measured. This allows extracting 84.6% (713 µCi) of the activity passed through the column.

Example 3

A 1000 µL solution containing 1325 µCi of [18F] is passed through a Waters Oasis HLB®/Kryptofix K222/potassium carbonate pre-conditioned column in 1 minute using a syringe pump. The activity extracted from the solution and actually trapped on the column is measured. This allows extracting 98.1% (1300 µCi) of the activity passed through the column.

Example 4

A 1000 µL solution containing 1570 µCi of [18F] is passed through a Thermo Hypercarb®/Tetradecyl-trimethylammonium bromide/potassium carbonate pre-conditioned column in 1 minute using a syringe pump. The activity extracted from the solution and actually trapped on the column is measured. This allows extracting 100% (1570 µCi) of the activity passed through the column.

Example 5

A 3500 µL solution containing 4253 µCi of [18F] is passed through a Waters Oasis HLB®/Dodecyl-trimethylammonium chloride/potassium carbonate pre-conditioned column in 3 minutes using a syringe pump. The activity extracted from the solution and actually trapped on the column is measured. This allows extracting 98.8% (4200 µCi) of the activity passed through the column.

Example 6

A 1000 µL solution containing 993 µCi of [18F] is passed through a poly(dibenzo-18-crown-6)/potassium carbonate pre-conditioned column in 1 minute using a syringe pump. The activity extracted from the solution and actually trapped on the column is measured. This allows extracting 25% (248 µCi) of the activity passed through the column.

Example 7

A 1000 µL solution containing 2905 µCi of [18F] is passed through a Waters Oasis HLB®/dibenzo 18-crown-6/potassium carbonate pre-conditioned column in 1 minute using a syringe pump. The activity extracted from the solution and actually trapped on the column is measured. This allows extracting 33.9% (985 µCi) of the activity passed through the column.

Example 8

A 1000 µL solution containing 1046 µCi of [18F] is manually passed through a C18/polyethyleneglycol 35000/potassium carbonate pre-conditioned column in 30 seconds. The activity extracted from the solution and actually trapped on the column is measured. This allows extracting 28.7% (300 µCi) of the activity passed through the column.

Example 9

A 2 mL solution of 270 mCi of [18F] fluoride in $^{18}O$ enriched water directly coming from the cyclotron target after a $^{18}O(p,n)^{18}F$ irradiation is passed through a Waters Oasis HLB®/Kryptofix K222/potassium carbonate pre-conditioned column in 2 minutes using the Helium flush used to purge the target. This allows extracting 67.8% (183.2 mCi) of the activity passed through the column.

Example 10

A 2 mL solution of 2.54 mCi of [18F] fluoride in water is passed through a Baker hydrophilic DVB/trimethyltetradecylammonium carbonate pre-conditioned column in 30 seconds. This allows extracting 100% (2.54 mCi) of the activity passed through the column.

Examples of Water Elimination from the Columns

Example 11

Drying with a Flush of Nitrogen

A Baker hydrophilic DVB/trimethyltetradecylammonium carbonate pre-conditioned column with 2.32 mCi of [18F] fluorides trapped was used. Water remaining on the column was eliminated using a flush of nitrogen during 5 minutes. The activity trapped was then eluted in 500 µl of dry ACN (containing less than 100 ppm of water). The residual water in the eluted medium was 987 ppm. The elution yield was 94% in this case.

Examples of Elution of the [18F] Fluoride from the Columns

Example 12

Elutions of the Radioactivity from the Above Exemplified Extraction

All experiments were performed using 1 mL of eluent and with a flow rate of 1 mL/min (see Table 2).

TABLE 2

| Corresponding extraction example: | Eluent | Eluted % |
|---|---|---|
| 1 | DMSO | 55.3 |
| 3 | ACN | 99.9 |
| 4 | ACN/2-Methyl-2-butanol | 94 |
| 5 | DMSO | 90.8 |
| 6 | ACN | 99 |
| 7 | ACN | 60.9 |
| 8 | ACN | 100 |
| 11 | ACN | 94% |

Example 13

Radioactivity extracted on a Waters Oasis HLB®/Kryptofix K222/potassium carbonate pre-conditioned column is eluted passing 250 µL of a solution of 1,3,4,6-tetraacetyl-2-O-trifluoromethanesulfonyl-β-D-mannopyranose and Kryptofix K222 in acetonitrile. This allows eluting 82.7% (1.97 mCi) of the activity trapped on the column.

Examples of Aliphatic Precursor Labelling

Example 14

The [18F] fluoride solution obtained from example 10 is heated 10 minutes at 100° C. in presence of potassium carbonate. This allows the direct labelling of the precursor with a radioTLC yield of 82.2%.

Example 15

A [18F] fluoride solution eluted by 1 mL of acetonitrile from a Waters Oasis HLB®/decyltrimethyl-ammonium bromide/potassium carbonate pre-conditioned column is heated at 95° C. for 10 minutes in presence of Kryptofix K222, potassium carbonate and 1,3,4,6-tetraacetyl-2-O-trifluoromethanesulfonyl-β-D-mannopyranose. This allows the labelling of the precursor with a radioTLC yield of 96.8%. A yield of 98.2% was obtained with 2 minutes of labelling.

Example 16

A [18F] fluoride solution eluted by 1 mL of acetonitrile from a Waters Oasis HLB®/decyltrimethyl-ammonium bromide/potassium carbonate pre-conditioned column is heated at 95° C. for 10 minutes in presence of Kryptofix K222, 1,8-Diazabicyclo[5.4.0]undec-7-ene and 1,3,4,6-tetraacetyl-2-O-trifluoromethanesulfonyl-β-D-mannopyranose. This allows the labelling of the precursor with a radioTLC yield of 98.7%.

Example 17

A [18F] fluoride solution eluted by 1 mL of acetonitrile from a Waters Oasis HLB®/decyltrimethyl-ammonium bromide/potassium carbonate pre-conditioned column is heated at 95° C. for 10 minutes in presence of Kryptofix K222, potassium carbonate and (S)-N-[(1-allyl-2-pyrrolidinyl)methyl]-5-(3-toluene-sulfonyloxypropyl)-2,3-dimethoxybenzamide. This allows the labelling of the precursor with a radioTLC yield of 65%.

Examples of Aromatic Precursors Labelling

Example 18

A [18F] fluoride solution eluted by 1 mL of dimethylsulfoxide from a Waters Oasis HLB®/decyltrimethyl-ammonium bromide/potassium carbonate pre-conditioned column is heated at 175° C. for 20 minutes in presence of 3,4-dimethoxy-2-nitrobenzaldehyde. This allows the labelling of the precursor with a radioTLC yield of 78.6%.

Example 19

A [18F] fluoride solution eluted by 1 mL of dimethylsulfoxide from a Waters Oasis HLB®/decyltrimethylammonium bromide/potassium carbonate pre-conditioned column is heated at 150° C. for 20 minutes in presence of Kryptofix K222, potassium carbonate and benzamide-N-[2-[4-(2-methoxyphenyl)-1-piperazinyl]ethyl]-4-nitro-N-2-pyridinyl. This allows the labelling of the precursor with a radioTLC yield of 63.5%.

Example 20

A [18F] fluoride solution eluted by 1 mL of dimethylsulfoxide from a Waters Oasis HLB®/decyltrimethyl-ammonium bromide/potassium carbonate pre-conditioned column is heated at 150° C. for 20 minutes in presence of Kryptofix K222, potassium carbonate and 6-nitropiperonal. This allows the labelling of the precursor with a radioTLC yield of 42.2%.

Examples of Precursor Labelling at Room Temperature (RT)

Example 21

A [18F] fluoride solution eluted by 1 mL of ACN from a Baker hydrophilic DVB/tetradecyltrimethylammonium carbonate pre-conditioned column is allowed to react at RT for 20 minutes in presence of 1.4 dinitrobenzene and 500 μL of dried TEAHCO$_3$ in ACN (25 mg/ml). This allows the labelling of the precursor with a HPLC yield of 43.6%.

Example 22

A [18F] fluoride solution eluted by 1 mL of ACN from a Baker hydrophilic DVB/tetradecyltrimethylammonium carbonate pre-conditioned column is allowed to react at RT for 5 minutes in presence of 1,3,4,6-tetraacetyl-2-O-trifluoromethanesulfonyl-β-D-mannopyranose. This allows the labelling of the precursor with a radioTLC yield of 57.5%.

Advantages of the Invention

The phases used in the preferred embodiments of the present invention, having a mixed polar/non-polar behaviour provide the following advantages:
- quantitative captures on more important water volumes than with pure non-polar phases as the coexistence of polar and non-polar moieties favours retention of the transfer agent. Moreover, the dissymmetry of ammonium (as well as the one of phosphonium and sulfonium) renders positive groups accessible, the long carbon chain interacting with the phase;
- quantitative elutions as the phase is sufficiently non-polar to permit to free the pair transfer agent ion-[18F] in an aprotic polar solvent, also thanks to the accessibility of polar groups of the transfer agent;
- the use of a simple nitrogen flux to eliminate residual water on the column as well as the use of a solvent (for example hexane) to rinse water out of the column;
- high labelling rates even at room temperature.

The invention claimed is:
1. A method to extract out of an aqueous solution, concentrate or reformulate [18F] fluorides without any evaporation step, or without any azeotropic evaporation step, said method comprising:
   passing aqueous [18F] fluoride solution through a solid phase extraction column containing a modified non-ionic solid support (SS) wherein [18F] fluorides are trapped on the modified non-ionic solid support,
   optionally purging the modified non-ionic SS with a neutral solvent or flushing it with a gas to remove residual water,
   eluting the [18F] fluorides in an organic solvent or in a mixture of organic solvents for radiolabelling,
      wherein modification of a non-ionic SS has been performed prior to [18F] fluoride extraction, concentration or reformulation process, by causing adsorption on a SS of a trapping agent (TA) which is a cationic species that has the ability to trap the [18F] fluoride in an anion exchange process, forming a TA-[18F] species and wherein a couple SS-TA is selected in such a way that the TA is substantially able to remain on the modified non-ionic SS during transit of the aqueous [18F] fluoride solution through the solid phase extraction column, while being eluted in an organic solvent or in a mixture of organic solvents for radiolabelling.

2. The method according to claim 1, wherein the modified non-ionic SS is selected from a group consisting of extraction resins and liquid chromatography resins comprising polar and non-polar phases.

3. The method according to claim 2, wherein said polar and non-polar phases are functionalized with or made of alkyl chains comprising 1 to 30 carbon atoms, polystyrene, cyclohexyl, poly(divinylbenzene), poly(styrene-divinylbenzene), phenyl, polyamide, aminopropyl (NH2), cyanopropyl (CN), alcohols or diols, carboxymethyl, hydroxylated poly(styrene-divinylbenzene), diethylaminoethyl, quaternary aminoethyl or sulfopropyl.

4. The method according to claim 3, wherein said polar and non-polar phases functionalized with or made of alkyl chains are selected from a group consisting of C2, tC2 C4, C8, C18, tC18 and C30.

5. The method according to claim 1, wherein the modified non-ionic SS is selected from a group consisting of solid phase extraction resins and liquid chromatography resins having an intermediate polar or non-polar character or a hydrophilic or lipophilic character.

6. The method according to claim 5, wherein said characters result from copolymerization of divinylbenzene or styrene, or the surface functionalization of preformed beads made of (co)polymers of divinylbenzene and styrene by the copolymerization with a vinyl co-monomer.

7. The method according to claim 6, wherein said vinyl co-monomer is selected from a group consisting of vinylpyrrolidone, vinylacetate, (methacryloyloxymethyl)naphtalene, 4,4'-bis(maleimido)diphenylmethane, p,p'-dihydroxydiphenylmethane diglycidylmethacrylic ester, p,p'-dihydroxydiphenylpropane diglycidyl methacrylic ester, 2-hydroxyethyl methacrylate (HEMA), 2,2-dimethylaminoethyl methacrylate (DMAEMA), ethylenedimethacrylate glycidylmethacrylate, N-vinylcarbazole, acrylonitrile, vinylpyridine, N-methyl-N-vinylacetamide, aminostyrene, methylacrylate, ethylacrylate, methylmethacrylate, N-vinylcaprolactam, N-methyl-N-vinylacetamide.

8. The method according to claim 5, wherein said characters result from a porous graphitized carbon phase.

9. The method according to claim 8, wherein the TA comprises a base for a subsequent [18F] labelling reaction.

10. The method according to claim 9, wherein the TA further comprises a metal salt cation complex ensuring trapping of metal salt on the modified non-ionic SS and is able to subsequently dissolve in an organic medium.

11. The method according to claim 10, wherein:
said metal salt cation complex is selected from a group consisting of an alkali group including lithium, sodium, potassium, rubidium and cesium, an alkaline earth metal group including magnesium, calcium, strontium and barium, and the ammonium cation ($NH_4^+$);
said metal salt is selected from a group of halogenides including fluor, chlor, brome, and iode, hydroxide, carbonates, phosphates, sulfates, carboxylates, acetate, alcoholates and perchlorate; and
a complexing agent is selected from a group consisting of cryptands, including 1,4,10-Trioxa-7,13-diaza-cyclopentadecane, 4,7,13,16,21,24-Hexaoxa-1,10-diazabicyclo[8.8.8]hexacosane, 4,7,13,16,21-Pentaoxa-1,10-diazabicyclo[8.8.5]tricosane, 4,7,13,18-Tetraoxa-1,10-diazabicyclo[8.5.5]eicosane, 5,6-Benzo-4,7,13,16,21, 24-hexaoxa-1,10-diazabicyclo[8.8.8]hexacos-5-ene, a group of glymes including 4'-Aminobenzo-15-crown-5, 4'-Aminobenzo-15-crown-5, 4'-Aminobenzo-15-crown-5 hydrochloride, 4'-Aminobenzo-18-crown-6, 4'-Aminodibenzo-18-crown-6, 2-Aminomethyl-15-crown-5, 2-Aminomethyl-15-crown-5, 2-Aminomethyl-18-crown-6, 4'-Amino-5'-nitrobenzo-15-crown-5, 4'-Amino-5'-nitrobenzo-15-crown-5, 1-Aza-12-crown-4, 1-Aza-15-crown-5, 1-Aza-15-crown-5, 1-Aza-18-crown-6, 1-Aza-18-crown-6, Benzo-12-crown-4, 5,6-Benzo-4,7,13,16,21,24-hexaoxa-1,10-diazabicyclo [8.8.8]hexacos-5-ene, 1-Benzyl-1-aza-12-crown-4, Bis [(benzo-15-crown-5)-15-ylmethyl]pimelate, 4'-Bromobenzo-15-crown-5, 4-tert-Butylbenzo-15-crown-5, 4-tert-Butylcyclohexano-15-crown-5, 4'-Carboxybenzo-15-crown-5, polyethylene glycols (PEG), polyethylene oxides (PEO), a group of calixarenes including 4-tert-Butylcalix[4]arene, 4-tert-Butylcalix[4]arene, 4-tert-Butylcalix[4]arene, 4-tert-Butylcalix[5]arene, 4-tert-Butylcalix[6]arene, 4-tert-Butylcalix[6]arene, 4-tert-Butylcalix[6]arene, 4-tert-Butylcalix[8]arene, 4-tert-Butylcalix[8]arene, 4-tert-Butylcalix[4]arene-tetraacetic acid tetraethyl ester, 4-tert-Butylcalix[4]arenetetraacetic acid tetraethyl ester, 4-tert-Butylcalix[4]arene-tetraacetic acid triethyl ester, Calix[4]arene, Calix[6]arene, Calix[8]arene, 4-(Chloromethyl)calix[4]arene, 4-Isopropylcalix[4]arene, C-Methylcalix[4]resorcinarene, C-Methylcalix[4]resorcinarene, meso-Octamethylcalix(4)pyrrole, 4-Sulfocalix[4]arene, 4-Sulfocalix[4]arene sodium salt, C-Undecylcalix[4]resorcinarene monohydrate, C-Undecylcalix[4]resorcinarene monohydrate, the group of cyclodextrines including α-Cyclodextrin, β-Cyclodextrin, γ-Cyclodextrin, (2,6-Di-O-)ethyl-β-cyclodextrin, 6-O-α-D-Glucosyl-β-cyclodextrin, Heptakis(6-O-t-butyldimethylsilyl-2,3-di-O-acetyl)-β-cyclodextrin, Heptakis(2,6-di-O-methyl)-β-cyclodextrin, Heptakis(2,3,6-tri-O-acetyl)-β-cyclodextrin, Heptakis(2,3,6-tri-O-benzoyl)-β-cyclodextrin, Hexakis (6-O-tertbutyldimethylsilyl)-α-cyclodextrin, Hexakis (2,3,6-tri-O-acetyl)-α-cyclodextrin, Hexakis (2,3,6-tri-O-methyl)-α-cyclodextrin, (2-Hydroxyethyl)-β-cyclodextrin, 6-O-α-Maltosyl-β-cyclodextrin hydrate, Methyl-β-cyclodextrin, 6-Monodeoxy-6-monoamino-β-cyclodextrin, Octakis (6-O-t-butyldimethylsilyl)-γ-cyclodextrin, Sulfopropyl-β-cyclodextrin, Triacetyl-α-cyclodextrin, Triacetyl-β-cyclodextrin, and a group of EDTA and derivatives including Ethylenediamine-N,N'-diacetic acid, 2-Bis(2-aminophenoxy)ethane-N,N,N', N'-tetraacetic acid, trans-1,2-Diaminocyclohexane-N, N,N',N'-tetraacetic acid monohydrate, trans-1,2-Diaminocyclohexane-N,N,N',N'-tetraacetic acid monohydrate, 1,3-Diamino-2-hydroxypropane-N,N,N', N'-tetraacetic acid, 1,2-Diaminopropane-N,N,N',N'-tetraacetic acid, 1,3-Diaminopropane-N,N,N',N'-tetraacetic acid, 1,3-Diamino-2-propanol-N,N,N',N'-tetraacetic acid, Diethylenetriamine-pentaacetic acid calcium trisodium salt hydrate, N-(2-Hydroxyethyl)ethylenediaminetriacetic acid trisodium salt hydrate, N-(2-Hydroxyethyl)ethylenediamine-N,N',N'-triacetic acid.

12. The method according to claim 9, wherein the TA further comprises a quaternary ammonium salt or a quaternary phosphonium salt or a sulfonium salt.

13. The method according to claim 12, wherein the TA is an asymmetric quaternary ammonium or phosphonium salt with R1, R2, R3 alkyl chains so that R1=R2=R3, R4 being a longer alkyl chain than R1 or with at least a perfluorinated alkyl chain.

14. The method according to claim 13, wherein R1, R2 and R3 have 1 to 4 carbon atoms and R4 has 7 to 18 carbon atoms.

15. The method according to claim 1, further comprising purging the solid phase extraction column with a flush of gas to in eliminate any remaining water so that all water content falls down under 1000 ppm.

16. The method according to claim 1, further comprising carrying out a [18F] labelling reaction with the solid phase extraction column containing extracted [18F] fluoride in a reactive form.

17. The method according to claim 1, further comprising quantitatively eluting the TA from the modified non-ionic SS with a low or no-water content organic solvent, said organic solvent being chosen so that any eluted medium is for an aliphatic or aromatic [18F] labelling reaction without any further evaporation step, and wherein residual water is lower than 7500 ppm, and lower than 1000 ppm when a gas drying step is performed.

18. The method according to claim 17, further comprising selecting said organic solvent from a group consisting of acetonitrile (ACN), dimethylsulfoxide (DMSO), dimethylformamide (DMF), tetrahydrofuran (THF), dioxane, ethyl acetate, sulfolane, hexamethylphosphotriamide (HMPA/HMPT), nitromethane and a mix thereof.

19. The method according to claim 17, further comprising selecting said organic solvent from an alcohol consisting of t-butanol, t-amyl alcohol, 2,3-dimethyl-2-butanol and 2-(trifluoromethyl)-2-propanol.

20. The method according to claim 17, further comprising selecting said organic solvent from any mixture consisting of acetonitrile (ACN), dimethylsulfoxide (DMSO), dimethylformamide (DMF), tetrahydrofuran (THF), dioxane, ethyl acetate, sulfolane, hexamethylphosphotriamide (HMPA/HMPT), nitromethane and a mix of the latter; and an alcohol selected from a group consisting of t-butanol, t-amyl alcohol, 2,3-dimethyl-2-butanol and 2-(trifluoromethyl)-2-propanol.

21. The method according to claim 1, further comprising selecting an organic solvent, wherein the organic solvent contains a quaternary ammonium salt, or a quaternary phosphonium salt.

22. The method according to claim 1, further comprising synthesizing a PET radiotracer with the organic solution containing the [18F] fluoride obtained after elution, said [18F] fluoride being reactive at room temperature for substitution reactions on both aliphatic and aromatic precursors.

23. The method according to claim 1, further comprising reusing the modified non-ionic SS for an extraction or elution process of a labelled precursor resulting from a labelling reaction.

24. The method according to claim 23, wherein the labelled precursor trapped on the solid phase extraction column is eluted in a solvent prior to a deprotection reaction.

25. The method according to claim 24, wherein the deprotection reaction is directly performed within the column containing the SS or by including a column in a reaction circuit.

26. The method according to claim 1, wherein said extraction, concentration or reformulation process is preceded by a preliminary concentration step performed on an additional column, the additional column comprising an anion exchange phase followed by an acid phase including a sulfonic or carboxylic resin, wherein the acid phase eliminates detrimental resin preconditioning ions, and wherein a combination of the anion exchange phase and the acid phase allows recovery of an activity in a volume at least 3 to 40 times lower and is compatible with the column containing the modified non-ionic SS support.

* * * * *

UNITED STATES PATENT AND TRADEMARK OFFICE
CERTIFICATE OF CORRECTION

PATENT NO. : 8,641,903 B2
APPLICATION NO. : 12/596254
DATED : September 23, 2014
INVENTOR(S) : Voccia et al.

Page 1 of 1

It is certified that error appears in the above-identified patent and that said Letters Patent is hereby corrected as shown below:

In the Claims

Column 17, Line 5-9 should read as follows

15. The method according to claim 1, further comprising purging the solid phase extraction column with a flush of gas to eliminate any remaining water so that all water content falls down under 1000 ppm.

Signed and Sealed this
Second Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,641,903 B2  
APPLICATION NO. : 12/596254  
DATED : February 4, 2014  
INVENTOR(S) : Voccia et al.

Page 1 of 1

It is certified that error appears in the above-identified patent and that said Letters Patent is hereby corrected as shown below:

In the Claims

Column 17, Line 6-9 should read as follows

15. The method according to claim 1, further comprising purging the solid phase extraction column with a flush of gas to eliminate any remaining water so that all water content falls down under 1000 ppm.

This certificate supersedes the Certificate of Correction issued December 2, 2014.

Signed and Sealed this  
Twenty-third Day of December, 2014

Michelle K. Lee  
*Deputy Director of the United States Patent and Trademark Office*